US008528955B2

(12) United States Patent
Robinson et al.

(10) Patent No.: US 8,528,955 B2
(45) Date of Patent: Sep. 10, 2013

(54) ROBOT END EFFECTOR WITH CABLE MANAGEMENT

(75) Inventors: Dennis Lee Robinson, Ruther Glen, VA (US); Roland Lomerson, Jr., Lakewood Ranch, FL (US)

(73) Assignee: AMF Automation Technologies, LLC, Richmond, VA (US)

( * ) Notice: Subject to any disclaimer, the term of this patent is extended or adjusted under 35 U.S.C. 154(b) by 401 days.

(21) Appl. No.: 13/011,983

(22) Filed: Jan. 24, 2011

(65) Prior Publication Data

US 2012/0186381 A1 Jul. 26, 2012

(51) Int. Cl.
*B66F 19/00* (2006.01)

(52) U.S. Cl.
USPC .......................................... 294/213; 294/185

(58) Field of Classification Search
USPC ................ 294/65, 183, 188, 64.2, 185, 213, 294/219; 901/40; 414/627, 404, 737, 752.1; 251/61, 61.2, 63.5
See application file for complete search history.

(56) References Cited

U.S. PATENT DOCUMENTS

| | | | |
|---|---|---|---|
| 3,558,171 A | 1/1971 | Netsch et al. | |
| 4,078,671 A | 3/1978 | Lundstrom | |
| 4,355,936 A | 10/1982 | Thomas et al. | |
| 4,787,812 A | 11/1988 | Gopfert | |
| 4,850,627 A | 7/1989 | Franklin | |
| 5,024,575 A | 6/1991 | Anderson | |
| 5,088,878 A | 2/1992 | Focke et al. | |
| 5,609,377 A | 3/1997 | Tanaka | |
| 5,752,729 A | 5/1998 | Crozier et al. | |
| 5,813,713 A | 9/1998 | Van Den Bergh | |
| 6,026,703 A * | 2/2000 | Stanisic et al. | 74/490.06 |
| 6,049,969 A * | 4/2000 | Jenkins et al. | 29/737 |
| 6,354,167 B1 * | 3/2002 | Snow | 74/490.01 |
| 6,860,531 B2 | 3/2005 | Sherwin | |
| 7,000,964 B1 | 2/2006 | Porras et al. | |
| 7,017,961 B1 | 3/2006 | Parnell et al. | |
| 7,134,833 B2 | 11/2006 | de Koning | |
| 7,153,088 B2 * | 12/2006 | Reimer et al. | 414/783 |
| 7,648,182 B2 | 1/2010 | Salimkhan | |
| 7,828,351 B2 | 11/2010 | Baumstimler | |
| 7,950,708 B2 | 5/2011 | Parnell | |
| 2007/0059149 A1 | 3/2007 | Rich | |
| 2008/0003092 A1 | 1/2008 | Baclija et al. | |
| 2008/0140257 A1 * | 6/2008 | Sato et al. | 700/258 |
| 2009/0206619 A1 | 8/2009 | Schmidt et al. | |
| 2010/0040450 A1 | 2/2010 | Parnell | |
| 2011/0254298 A1 | 10/2011 | Lomerson, Jr. | |

OTHER PUBLICATIONS

M-420iA/M-421iA, Fanuc Robotico Brochure 2007, 10 pages.

\* cited by examiner

*Primary Examiner* — Stephen Vu
(74) *Attorney, Agent, or Firm* — Thomas/Horstemeyer, LLP

(57) ABSTRACT

Cable manager 30 is positioned between the distal end of a robot arm 16 and the robot end effector 18. Elongated cable carrier 44 positioned in a circular cable track 34 extends in an arc about the axis of connection 17 between the robot arm and the end effector. One end 56 of the cable carrier moves with the robot arm and the other end 54 moves with the end effector. The cable carrier forms a U-shape 60 between its ends so that the movements of the ends of the cable carrier result in the U-shape accommodating the change in distance between the ends of the utility line and the cable carrier. Utility lines 62 are gathered in one or more cables that extend through the cable carrier to provide the end effector with the controls necessary for its operation.

18 Claims, 8 Drawing Sheets

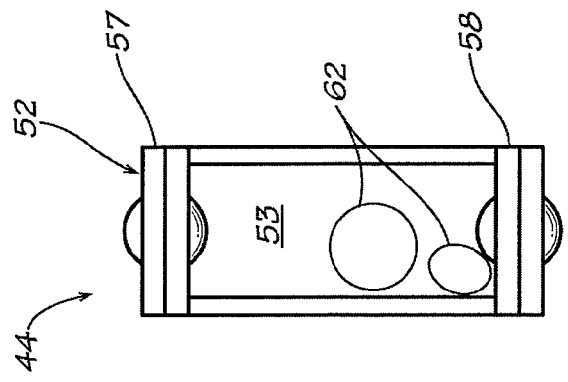
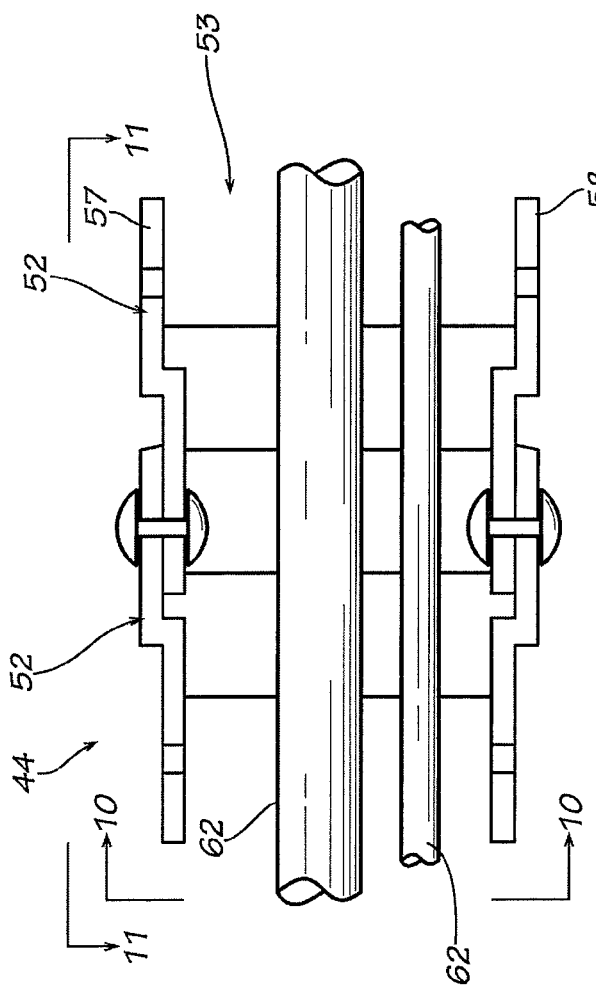
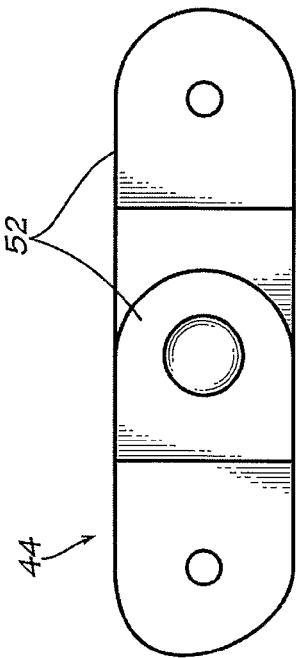

ROBOT END EFFECTOR WITH CABLE MANAGEMENT

TECHNICAL FIELD

This disclosure concerns a robotic packaging apparatus having a vacuum actuated end of arm effector for collecting work products of different shapes and sizes in different patterns for delivery to a receptacle, such as to a shipping container. More particularly, this disclosure concerns a cable management system for controlling and aligning the utility lines such as vacuum conduits, air lines, electrical and sensor cables, that extend between an articulated robot arm and the attached rotating and multi-axis moving vacuum head, known as an end of arm effector (hereinafter "end effector"). The cable management system reduces twisting, breaking, wear and the fatigue on the utility lines connected between the robotic arm and the end effector.

BACKGROUND OF THE DISCLOSURE

In robotic packaging operations, a producer might desire to ship work products in shipping containers of a standard shape and size. Robots might be used for performing the packing of the goods in the containers. The shape and size of the individual work products might be different from one job to the next. In order to ship different size and shape work products in standard size containers the robot is likely to be required to turn the end effector with respect to the robot arm to collect the work products in a certain "pick pattern" of work products on the face of the end effector that corresponds to the shape and size of the standard container.

For example, in the bakery industry a producer typically will produce several sizes of loaves of bread from time to time and have one size and shape container in which the producer ships the products. The different size loaves might fit best in the standard container when configured in different arrangements or pick patterns than other sized loaves. A robot may be used to pick up the loaves from a line of the loaves by using multiple picks, by rotating and tilting the end effector to different orientations for each pick. This allows the robot to form the desired pattern of the products on the end effector.

Once loaded with the work products in the desired pattern, the robot moves the end effector to the container and the robot then might rotate and/or tilt the end effector to deposit the products into the container all at once in the desired pattern.

The robot must have various vacuum conduits, air lines, electrical and sensor cables (hereinafter "utility lines") that communicate with the end effector to control the various suction cups and movements that perform the picking functions and to control the picking and delivery movements of the end effector. The turning, tilting, raising, stretching and lowering of the end effector with respect to the robot arm cause the utility lines to bend, turn and/or twist and to deteriorate over time, and they must be replaced and/or repaired.

It is to this need for avoiding deterioration of the utility lines that this disclosure is directed.

SUMMARY OF THE DESCRIPTION

Briefly described, one form of the following disclosure concerns an end effector of a robot for picking work products in a selected pattern from an accumulation of work products and for placing the retrieved work products in the selected pattern in a receptacle. The end effector may include a vacuum plenum housing with an array of vacuum retrievers extending down from said vacuum plenum housing for engaging the work products. A valve is positioned in communication with each vacuum retriever to selectively control the source of reduced air pressure needed to pick certain ones of the work products.

The vacuum retrievers may be cup-shaped bellows with annular protrusions, and the valve may be supported in said bellows at one of said annular protrusions. Vacuum retrievers that may be used with this invention are disclosed in more detail in co-pending application Ser. Nos. 12/192,184 and 12/763,242.

This disclosure concerns a method and apparatus for selectively robotically collecting work products in a selected pattern from an accumulation of work products and placing the work products in a receptacle. The method includes rotating an end effector about an upwardly extending axis with respect to its robot arm to engage some of the work products in the accumulation of work products with a plurality of vacuum retrievers in a first group of the vacuum retrievers, applying a sub-atmospheric air pressure to the vacuum retrievers in the first group of vacuum retrievers while avoiding drawing sub-atmospheric air pressure in the remaining vacuum retrievers, and picking the work products from the accumulation of work products with the vacuum retrievers in the first group of the end effector. After the first pick has been made, the end effector may be rotated with the robot arm about the upwardly extending axis to a different orientation with respect to the accumulation of work products and then re-engage the accumulation of work products with a second group of the vacuum retrievers and make a second pick of the work products in a different pattern on the face of the end effector.

These rotary movements and other movements between the robot arm and the end effector are required to form the desired pick pattern on the end effector and to deliver the work products to the shipping containers.

During the process of picking the work products with the end effector it may be necessary to rotate the end effector several times, and then the end effector is moved to the shipping container and is rotated to place the work products in registration with the shipping container, and the sub-atmospheric air pressure to the work products is terminated to release the work products from the end effector.

The robotic packaging apparatus includes a robot arm, an end effector mounted to the end of the robot arm for collecting work products, and the end effector is rotatable with respect to said robot arm about an upwardly extending axis. An elongated cable carrier extends in an arc about the axis and has a first cable carrier end positioned at a first position at the arc, and a second cable carrier end positioned at the arc and movable along the arc toward and away from the first cable carrier end.

The cable carrier is of a constant length and accumulates in a U-shape at an intermediate cable carrier portion when the second cable carrier end moves toward the first cable carrier end. A cable including utility lines extends along the cable carrier for connecting the utility lines between the robot arm and the end effector.

The cable management apparatus may include an arcuate race extending about the axis, and the second end of the cable carrier is movable along the arcuate race in response to the rotation of the end effector about its axis.

The arcuate race of the cable management apparatus may include an inner race and an outer race. The cable carrier may extend from the first cable carrier end in one of the races and the cable carrier may extend from the second cable carrier end in the other race.

The second cable carrier end may move about the axis in response to the rotation of said end effector with respect to said robot arm. The utility lines are carried by the cable carrier and include utility lines selected from the group consisting of: vacuum conduits, air lines, electrical and sensor cables that may be directed from multiple locations along said robot arm to the end effector.

The cable carrier comprises a plurality of chain links connected in series, and the chain links define a cable passage through which the utility cable extends.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The components in the attached drawings are not necessarily to scale, emphasis instead being placed upon clearly illustrating the principles of the present invention. Moreover, in the drawings, like reference numerals designate corresponding parts throughout the several views.

FIG. 9 is a side cross sectional view of a pair of chain links.

FIG. 10 is an end view of the chain links of FIG. 9, taken along lines 10-10 of FIG. 9.

FIG. 11 is a top view of the chain links of FIG. 9, taken along lines 11-11 of FIG. 9.

DETAILED DESCRIPTION

Figure 1:
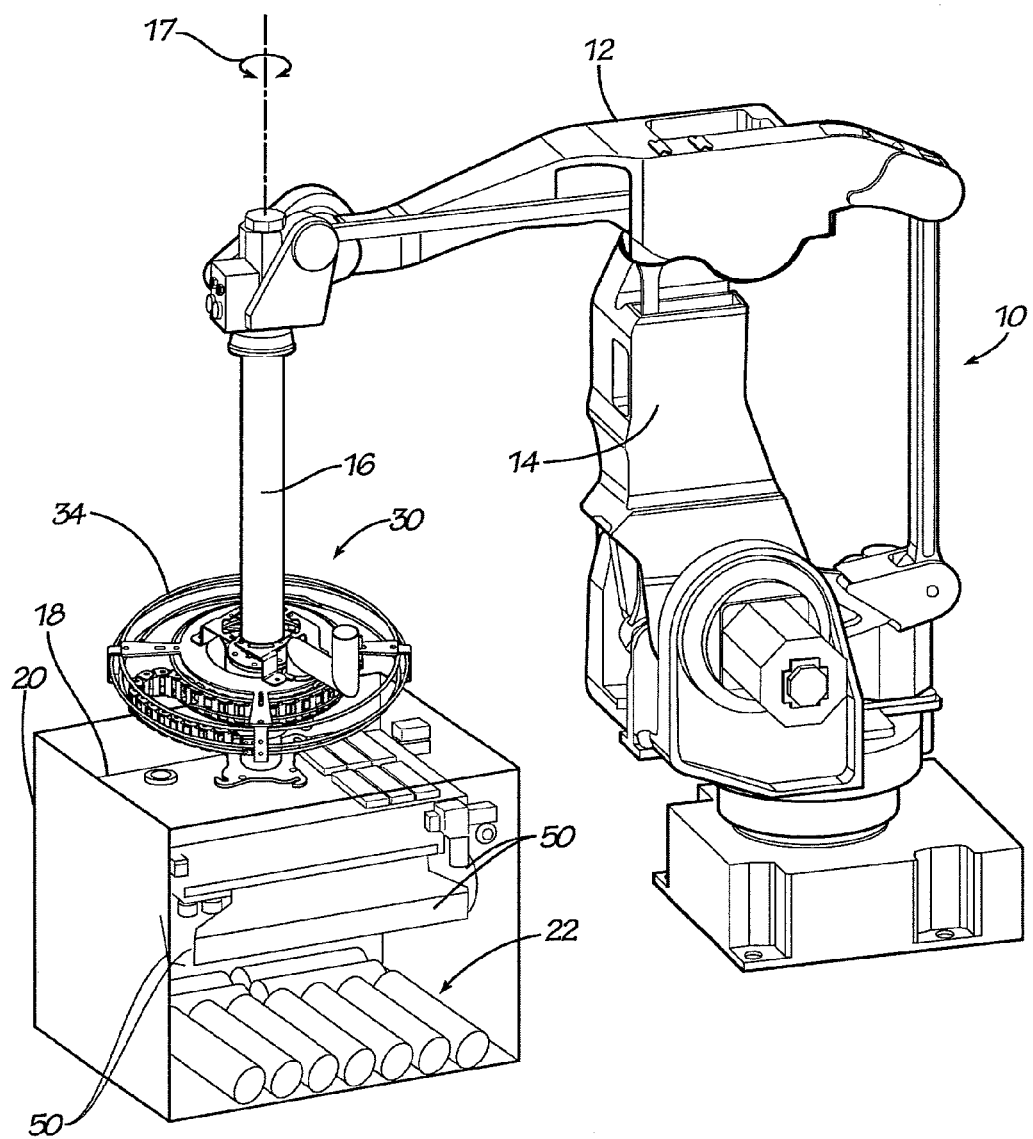
FIG. 1 is an isometric view from a high perspective of a robot and its vacuum assisted programmable zoned end effector and the standard container for receiving the work product.
Figure 2:
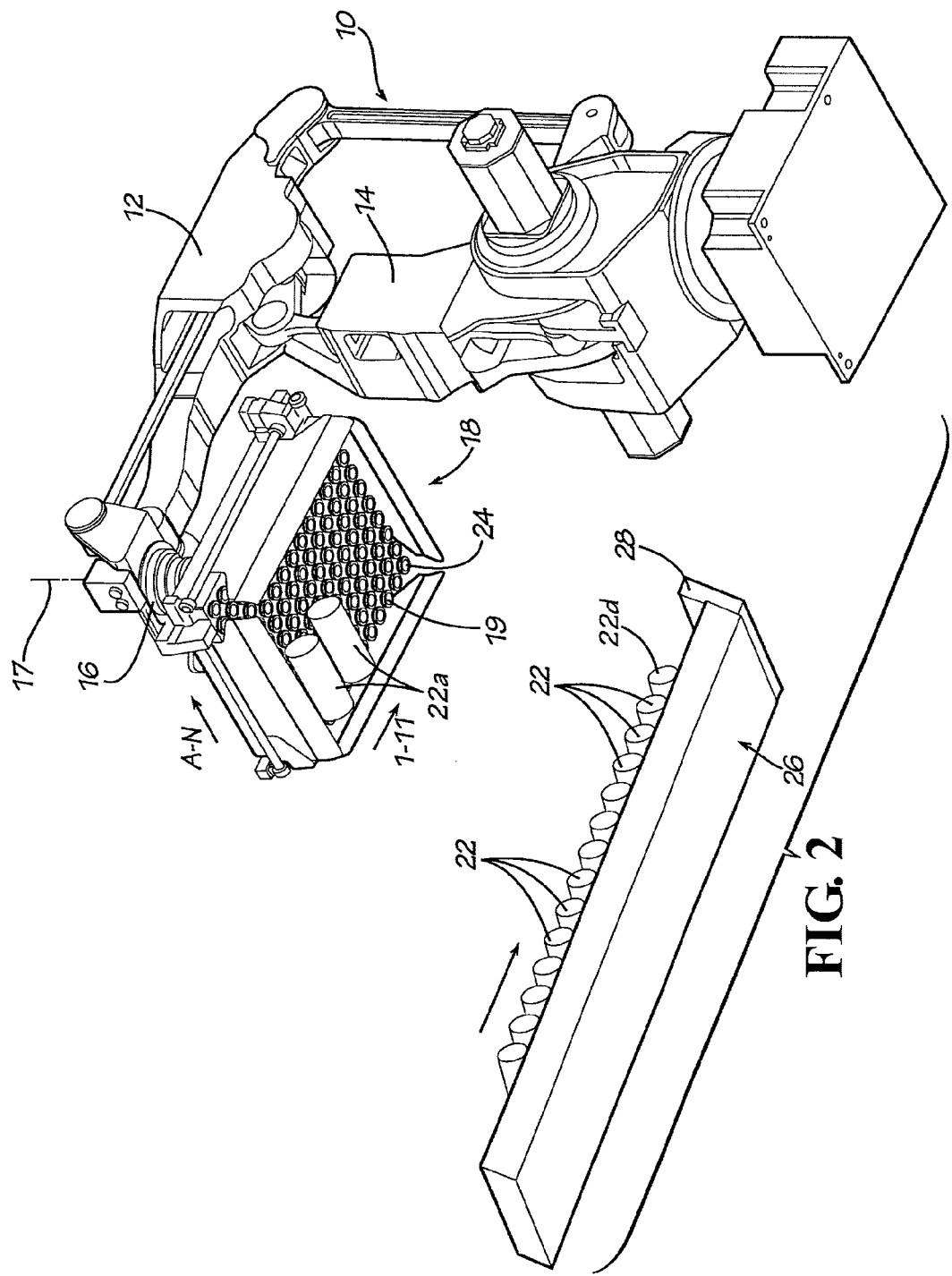
FIG. 2 is an isometric view from a low perspective of the robot and its end effector of FIG. 1, showing how some of the vacuum retrievers of the end effector have picked some of the work products.

Referring now in more detail to the drawings, in which like numerals indicate like parts throughout the several views, FIGS. 1 and 2 illustrate a robot 10 of conventional articulating design, being pivotal about an upright axis, having a rocker arm 12 mounted on a rotary stanchion 14, and an articulating robot arm 16 mounted at its upper end to the distal end of the rocker arm. The end effector 18 is mounted to the distal end of the robot arm 16 and the movements of the end effector usually are controlled by a program entered in the robot's computer system. The robot arm and the rotary stanchion have parts therein (not shown) with the capacity to rotate, lift, lower, tilt and moved laterally the end effector, as is common in the art.

As shown in FIG. 1, the end effector 18 has been placed in alignment with the container 20 which is a packing container. The work products 22 have been released by the end effector 18 and have been deposited on the bottom wall of the container 20. In the embodiment illustrated, the container is a box-shaped receptacle but may be a basket, tray, pallet, or various other receptacles or surfaces.

For purposes of illustration, without restriction, the robot is disclosed herein as being an apparatus and product for packing bakery products such as bread, buns, English muffins, bagels, hot dog buns and loaves of bread of varying size and shapes, and the details of this disclosure are directed to work products of in shapes of packaged loves of bread 22. However, other work products in various shapes may be handled with this invention.

FIG. 2 shows the robot 10 from a lower perspective, showing the end effector 18 in a position that reveals the suction surface 19 of the end effector. The suction surface 19 includes an array of vacuum retrievers, such as the corrugated or "bellowed" suction cups 24 that are to be applied to and that are to pick the loaves of bread 22 or other work product.

Figure 3:
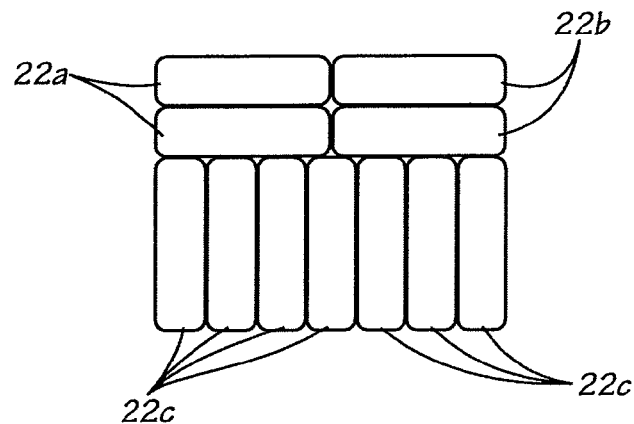
FIG. 3 is a diagram of a desired configuration of the work product on the vacuum assisted zoned end effector as picked from an accumulation of the work products when to be delivered to a standard receptacle.
Figure 4:
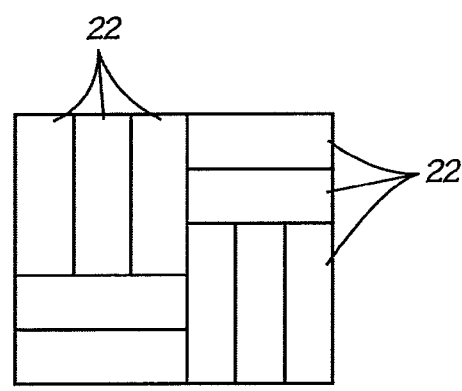
FIG. 4 is a diagram of another example of a desired configuration of the work product on the vacuum assisted zoned end effector.
Figure 5:
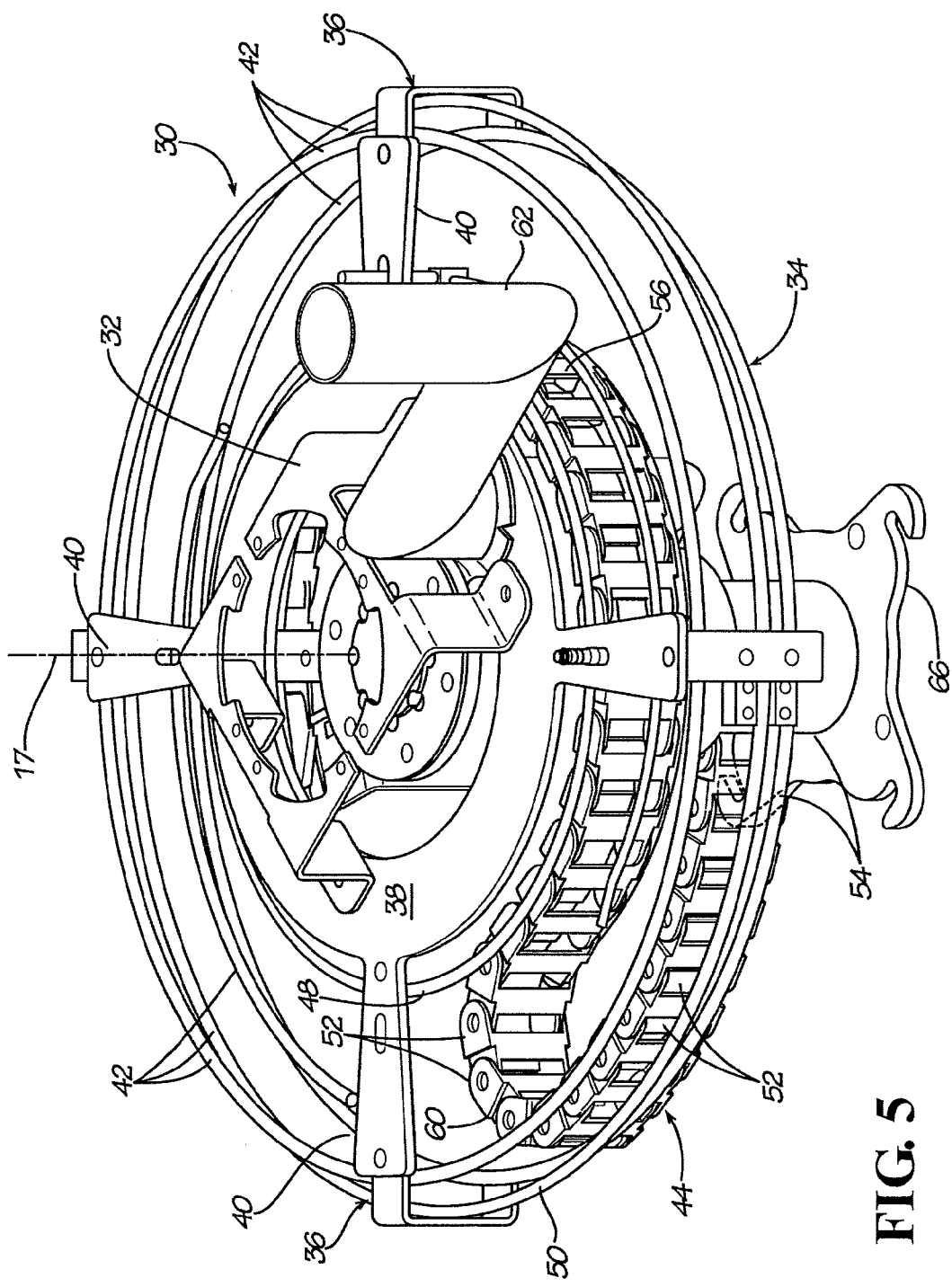
FIG. 5 is a perspective view of the cable manager that is used with the robot arm and the end effector.

FIGS. 3 and 4 show sample arrangements of layers of loaves of bread when placed in a receptacles. A typical loaf of bread such as those shown at 22 in FIGS. 2-5 may be four inches wide and fourteen inches long, wrapped in a plastic film bag that has extra material gathered at one end to close about the end of the loaf.

An example of a container used by the producer to ship the loaves may have an inside dimension of twenty-two inches by twenty-eight inches. The desired pattern for best fitting the most loaves of this size in this size container is shown in FIG. 3 and is to have loaves end-to-end on the twenty-eight inch dimension side of the container. Next, another two loaves are placed end-to-end beside the first two loaves. Finally seven loaves are turned perpendicular to the previous loaves so that their fourteen inch dimension fits the remaining fourteen inch available space in the container. This allows eleven loaves in each level of the container which is the most loaves possible for this size loaf in this size container. If the loaves are of a different shape or size, or if the receptacle is of a different shape or size, the arrangement of the loaves is likely to change to better fit the dimensions of the receptacle.

In order to pick the loaves 22 in the pick pattern shown in FIG. 3 or 4, the robot usually rotates end effector 18 several times about its upwardly extending axis 17 to align the end effector and its suction cups 24 with the supply of work products 22 at the stop 28 of the surface conveyor 26 of FIG. 2 and to deliver the work products to the container 20 of FIG. 1.

FIGS. 1 and 5-8 illustrate the cable manager 30 that is mounted between the robot arm 16 and the end effector 18. The cable manager 30 includes a mounting bracket 32 that is connected to the exterior surface of the articulating robot arm 16 so that it is a non-rotating component of the cable manager. Cable track 34 includes support spider 36 that includes an inner support ring 38 that is rigidly mounted to the mounting bracket 32 and radiating support legs 40 that extend outwardly from the inner support ring. A plurality of circular guide rails 42 extend generally concentric with respect to the upwardly extending axis 17. The mounting bracket 32, cable track 34 support spider 36 are fixed to the robot arm 16 and are movable with the robot arm.

Cable carrier 44 is positioned within and is movable in an arcuate path within the guide rails 42 about the upwardly extending axis 17. The guide rails 42 form a pair of arcuate races that extend about the upwardly extending axis 17, including an inner race 48 and an outer race 50 and the cable carrier 44 is supported by the inner and outer races 48 and 50.

Figure 6:
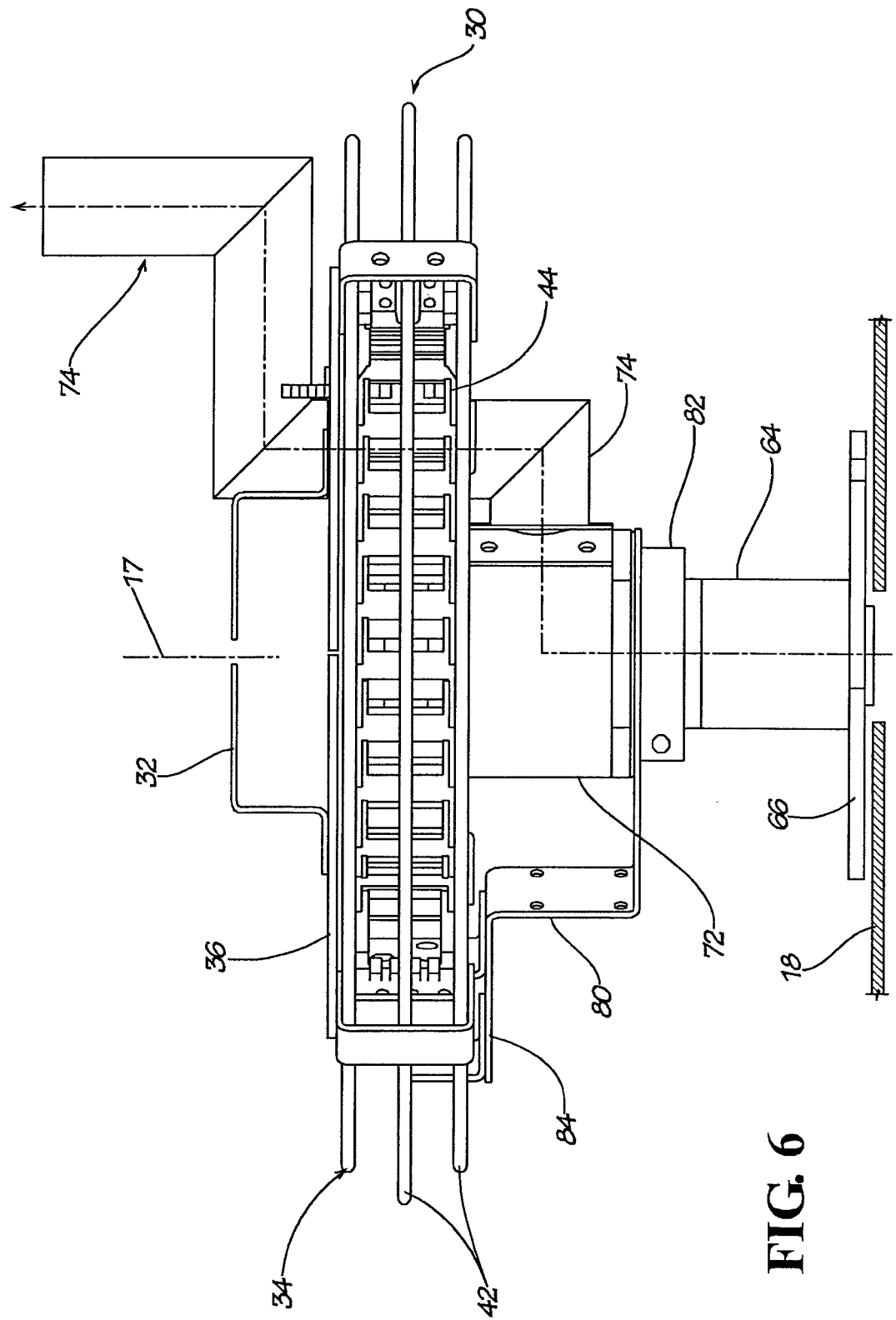
FIG. 6 is a side view of the cable manager.
Figure 7:
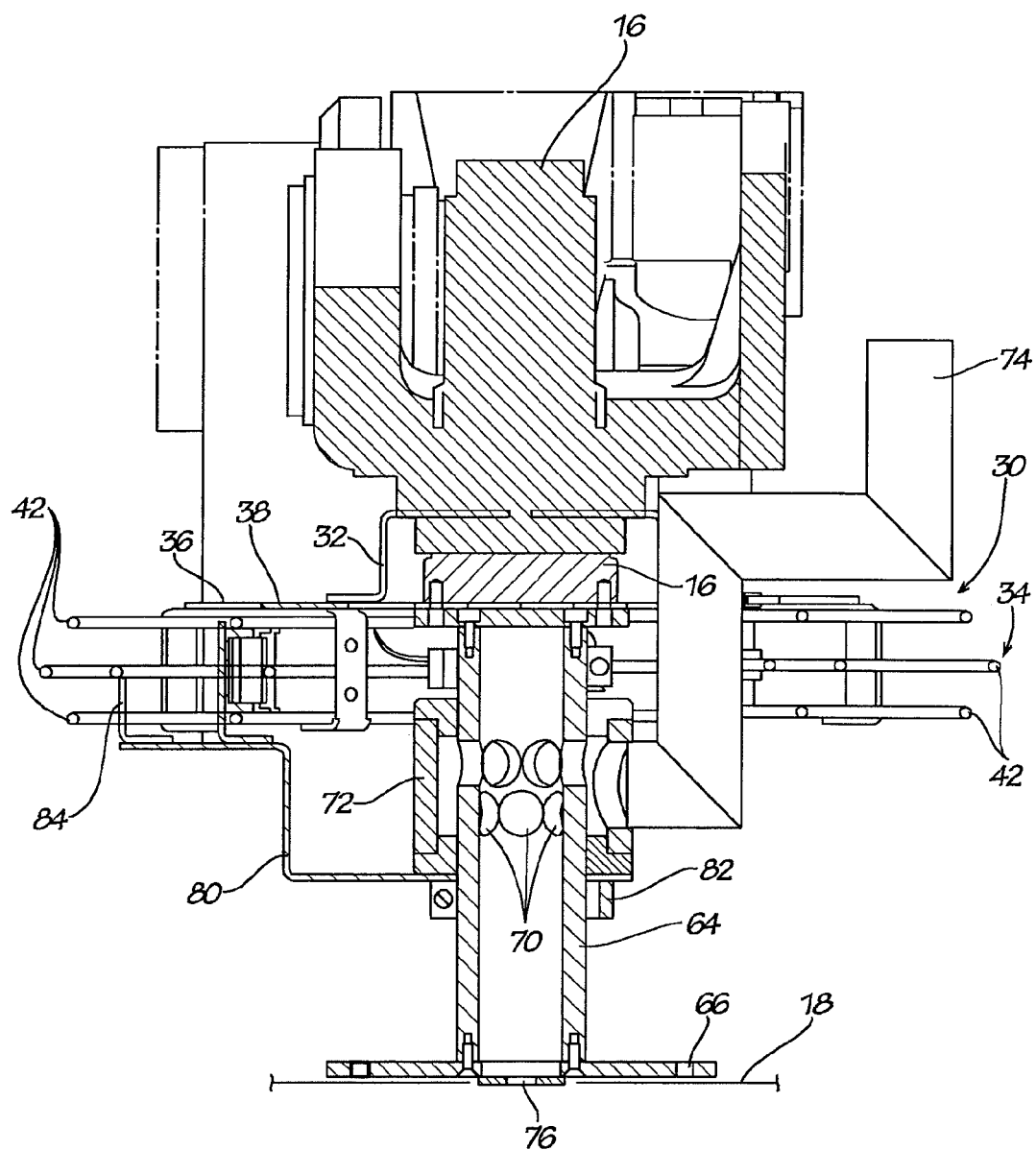
FIG. 7 is a side cross sectional view of the cable manager.
Figure 8:
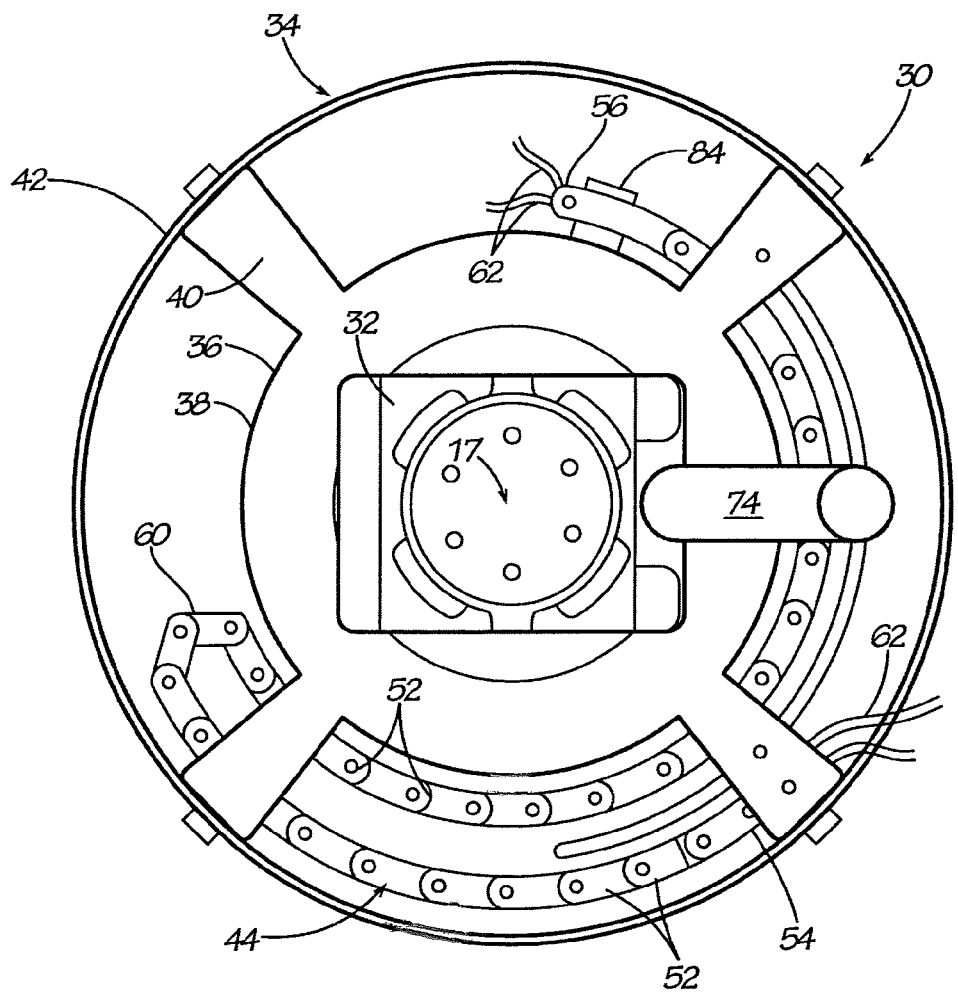
FIG. 8 is a plan view of the cable manager.

As shown in FIGS. 9-11, cable carrier 44 is formed of a plurality of chain links 52 so that the chain links pivot with respect to the next adjacent chain link. The chain links 52 are formed to have horizontal passages 53 extend there through as defined by opposed chain side walls 55 and top and bottom walls 57, 58, respectively so each passage 53 of each chain link is generally aligned with the passage of an adjacent chain link, and the utility lines 62 may be extend through the aligned passages 53 of the chain links from the fixed outer cable carrier end 54 to the movable inner cable carrier end 56. As shown in FIGS. 6-8, the outer cable carrier end 54 is mounted in a stationary position within the guide rails 42 of the cable track 34. The inner cable carrier end 56 is connected to and is movable with end effector 18 as will be described hereinafter.

The cable carrier 44 extends in a counterclockwise direction (FIG. 8) from outer cable carrier end 54 and the cable carrier turns at a U-shaped intermediate portion 60 so that it extends in a counterclockwise direction toward the inner cable carrier end 56. The inner cable carrier end 56 is movable in an arc about the upwardly extending axis 17, either toward or away from the fixed outer cable carrier end 54 in response to rotary movement of the end effector about central axis 17.

Since there is a U-shaped bend 60 in the intermediate portion of the cable carrier 44, and since the cable carrier is of a fixed length, when the inner cable carrier end 56 is moved in a clockwise direction, more chain links will be moved toward the U-shaped bend 60 so that more cable links will be accumulated at the outer portion of the cable carrier. Conversely, when the movable inner cable carrier end 56 moves in a counterclockwise direction, some of the chain links 52 adjacent the U-shaped bend 60 will move about the U-shaped bend to allow more chain links to enter the portion of the chain extending toward the inner cable carrier end 56.

With this arrangement, a fixed length cable carrier 44 can be used to accommodate the utility lines 62 in the aligned horizontal passages 53 and to carry fixed length utility lines 62 while allowing the movable inner cable carrier end 56 to move closer to or farther away from the fixed outer cable carrier end 54. This tends to reduce twisting of the utility lines 62 upon rotation of the end effector with respect to the articulating robot arm 16 and to apply a controlled wide bend in the utility lines at the U-shaped bend in the cable carrier.

As best shown in FIGS. 6 and 7, the articulating robot arm 16 extends through the mounting bracket 32 and is connected to the rotary tube 64, and support plate 66 is mounted to the lower end of the rotary tube and to the upper portion of the end effector 18. The connection between the robot arm 16, the rotary tube 64, and the support plate provides the support and the rotary motion of the end effector 18, as described above.

As shown in FIG. 7, the rotary tube 64 includes a plurality of radially extending air passages 70 and the fixed vacuum sleeve 72 is in communication with the air passages 70 of the rotary vacuum tube 64. Fixed position vacuum supply conduit 74 is in communication at its upper end with a conventional source of vacuum. The vacuum supply conduit extends downwardly through the cable manager 30 and communicates with the fixed vacuum sleeve 72. The air from the end effector 18 is induced to pass from the end effector upwardly through the outlet port 76, through the rotary vacuum tube 64, through the fixed vacuum sleeve 72, and out through the fixed position vacuum supply conduit 74. This allows the end effector to maintain a source of vacuum for inducing air to pass from the atmosphere up through suction cups 23 in response to the valves (not shown) opening to permit passage through the suction cups.

Control arm 80 is connected by means of collar 82 to the rotary vacuum tube 64 so that the control arm rotates in unison with the rotary vacuum tube 64. The upper end 84 of the control arm extends into cable track 34, between the guide rails 42 for connection to inner cable carrier end 56. Since the control arm 80 is movable in unison with the end effector 18, the rotation of the end effector causes an arcuate movement of the control arm 80 and of the inner cable carrier end 56 about the upwardly extending axis 17 of the cable manager 30.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. A robotic packaging apparatus comprising:
   an articulating robot arm,
   an end effector mounted to an end of the robot arm for collecting work products, said end effector rotatable with respect to said robot arm about an upwardly extending axis,
   a cable management apparatus positioned between said robot arm and said end effector, said cable management apparatus including an arcuate race, an elongated cable carrier extending in an arc of said arcuate race about said upwardly extending axis and having a first cable carrier end positioned at a first position at said arc of said arcuate race, and a second cable carrier end positioned at said arc of said arcuate race and movable along said arc of said arcuate race toward and away from said first cable carrier end,
   said cable carrier having a substantially fixed length such that the cable carrier accumulates in a U-shaped intermediate cable carrier portion when said second cable carrier end moves toward said first cable carrier end, and
   a cable including utility lines extending along said cable carrier for connecting the utility lines between said robot arm and said end effector.

2. The robotic packaging apparatus of claim 1, wherein said arcuate race includes an inner race and an outer race, said cable carrier extends from said first cable carrier end in one of said inner race or outer race and said cable carrier extends from said second cable carrier end in the other of said inner race or said outer race.

3. The robotic packaging apparatus of claim 1, wherein said second cable carrier end moves about the upwardly extending axis in response to the rotation of said end effector with respect to said robot arm.

4. The robotic packaging apparatus of claim 1, wherein said utility lines include utility lines selected from the group consisting of: vacuum conduits, air lines, electrical and sensor cables that are directed from multiple locations along said robot arm to the end effector.

5. The robotic packaging apparatus of claim 1, wherein said first cable carrier end is non-rotatably mounted to said cable carrier robot arm.

6. The robotic packaging apparatus of claim 5, wherein said chain links define a cable passage through which the cable extends.

7. The robotic packaging apparatus of claim 1, wherein said cable carrier comprises a series of chain links connected in series.

8. The end effector of claim 1, wherein said arcuate race is non-rotatably mounted to said robot arm and said second cable carrier end is non-rotatably mounted to said end effector.

9. The robotic packaging apparatus of claim 1 wherein said end effector comprises a vacuum plenum housing, said vacuum plenum housing comprising an array of vacuum retrievers.

10. A robotic packaging apparatus comprising:
a robot arm,
an end effector mounted to an end of the robot arm for collecting work products, said end effector rotatable with respect to said robot arm about an axis,
an elongated cable carrier extending in an arc of an arcuate race about said axis and having a first cable carrier end positioned at a first position at said arc of an arcuate race, and a second cable carrier end positioned at said arc of said arcuate race and movable along said arc of said arcuate race toward and away from said first cable carrier end,
said cable carrier including a U-shaped intermediate cable carrier portion when said second cable carrier end moves toward said first cable carrier end, and
a cable including utility lines extending along said cable carrier for connecting the utility lines between said robot arm and said end effector.

11. The robotic packaging apparatus of claim 10, wherein said arcuate race includes an inner race and an outer race, said cable carrier extends from said first cable carrier end in one of said inner race or outer race and said cable carrier extends from said second cable carrier end in the other of said inner race or said outer race.

12. The robotic packaging apparatus of claim 10, wherein said second cable carrier end moves about axis in response to the rotation of said end effector with respect to said robot arm.

13. The robotic packaging apparatus of claim 10, wherein said utility lines include utility lines selected from the group consisting of: vacuum conduits, air lines, electrical and sensor cables that are directed from multiple locations along said robot arm to the end effector.

14. The robotic packaging apparatus of claim 10, wherein said first cable carrier end is non-rotatably mounted to said cable carrier robot arm.

15. The robotic packaging apparatus of claim 10, wherein said cable carrier comprises a series of chain links connected in series.

16. The robotic packaging apparatus of claim 15, wherein said chain links define a cable passage through which the cable extends.

17. The robotic packaging apparatus of claim 10, wherein said arcuate race is non-rotatably mounted to said robot arm and said second cable carrier end is non-rotatably mounted to said end effector.

18. The robotic packaging apparatus of claim 10, wherein said end effector comprises a vacuum plenum housing, said vacuum plenum housing comprising an array of vacuum retrievers for retrieving work products.

* * * * *